United States Patent
Sambhwani et al.

(10) Patent No.: US 9,591,623 B2
(45) Date of Patent: Mar. 7, 2017

(54) SYSTEM AND METHOD FOR SUPPORTING CONCURRENT DEPLOYMENT OF MULTIPLE TRANSMISSION TIME INTERVALS FOR UPLINK TRANSMISSIONS BY USER EQUIPMENT IN A NON-DEDICATED CHANNEL STATE

(75) Inventors: Sharad Deepak Sambhwani, San Diego, CA (US); Ravi Agarwal, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 13/438,109

(22) Filed: Apr. 3, 2012

(65) Prior Publication Data

US 2012/0250644 A1 Oct. 4, 2012

Related U.S. Application Data

(60) Provisional application No. 61/471,299, filed on Apr. 4, 2011.

(51) Int. Cl.
*H04W 72/04* (2009.01)
*H04W 74/00* (2009.01)
*H04W 72/02* (2009.01)
*H04W 72/12* (2009.01)

(52) U.S. Cl.
CPC ..... *H04W 72/0413* (2013.01); *H04W 74/004* (2013.01); *H04W 72/02* (2013.01); *H04W 72/12* (2013.01)

(58) Field of Classification Search
CPC ..................................................... H04W 72/02
USPC .................................................. 370/252, 335
See application file for complete search history.

(56) References Cited

U.S. PATENT DOCUMENTS

| | | | |
|---|---|---|---|
| 2005/0073985 A1* | 4/2005 | Heo et al. ..................... | 370/342 |
| 2006/0268717 A1* | 11/2006 | Kanterakis ................... | 370/235 |
| 2010/0220623 A1 | 9/2010 | Cave et al. | |
| 2010/0238829 A1 | 9/2010 | Sambhwani et al. | |
| 2010/0329182 A1 | 12/2010 | Wigard et al. | |
| 2011/0019655 A1 | 1/2011 | Hakola | |

FOREIGN PATENT DOCUMENTS

EP 2192795 A1 6/2010

OTHER PUBLICATIONS

Huawei, HiSilicon; "Support concurrent deployment of 2ms and 10ms TTI in a cell", 3GPP TSG RAN WG2 #74, R2-112977, Barcelona, Spain, May 9-13, 2011.
International Search Report and Written Opinion—PCT/US2012/032166—ISA/EPO—Aug. 8, 2012.
(Continued)

*Primary Examiner* — Hassan Kizou
*Assistant Examiner* — Ashil Farahmand
(74) *Attorney, Agent, or Firm* — Darren M. Simon

(57) ABSTRACT

A random access procedure for UEs in Cell_FACH or another suitable non-DCH state, which enables concurrent deployment of 2 ms and 10 ms TTIs for uplink transmissions on the E-DCH. In some examples, the procedure may further enable utilization of a Rel-99 PRACH transmission by UEs in the Cell_FACH or other suitable non-DCH state.

20 Claims, 12 Drawing Sheets

(56) References Cited

OTHER PUBLICATIONS

QUALCOMM Incorporated: "Supporting concurrent deployment of 2ms and 10ms TTI in a cell in CELL_FACH", 3GPP Draft; R2-112136 Concurrent 2MS 10MS TTI Cell Fach, 3rd Generation Partnershtp Project T3GPP), Mobile Competence Centre ; 650, Route Des Lucioles ; F-06921 Sophia-antipolis Cedex ; France, v o 1 . RAN WG2, No. Shanghai, China; Apr. 11, 2011, Apr. 5, 2011 (Apr. 5, 2011), XP050494547.
QUALCOMM Incorporated: "Introducing further enhancements to CELL_FACH operation", 3GPP TSG RAN WG1 Meeting #64 R1-110688, Feb. 2011.
Nokia: "Nokia Siemens Networks, Enhanced CELL_FACH State with E-DCh", 3GPP TSG-RAN WG2 Meeting #59bis R1-074300, Oct. 2007.
Nokia: "Nokia Siemens Networks, Transmission type selection in CELL_FACH state", 3GPP TSG-RAN WG1 Meeting #51 R1-074667, Nov. 2007.

\* cited by examiner

SYSTEM AND METHOD FOR SUPPORTING CONCURRENT DEPLOYMENT OF MULTIPLE TRANSMISSION TIME INTERVALS FOR UPLINK TRANSMISSIONS BY USER EQUIPMENT IN A NON-DEDICATED CHANNEL STATE

CROSS-REFERENCE TO RELATED APPLICATIONS

This application claims priority to and the benefit of provisional patent application No. 61/471,299, entitled "APPARATUS AND METHOD FOR CONCURRENT SCHEDULING IN A CELL USING DIVERSE TRANSMISSION TIME INTERVALS", filed in the United States Patent and Trademark Office on Apr. 4, 2011, the entire content of which is incorporated herein by reference.

BACKGROUND

Technical Field

Aspects of the present disclosure relate generally to wireless communication systems, and more particularly, to the assignment of resources for use in uplink transmissions in a wireless communication system.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In many modern wireless communication systems, to enable a high level of control over power usage, mobile stations can take any of various different states based on their needs at any particular time. For example, a spectrum of these states can include a state with dedicated resources assigned to the mobile station; various levels of standby states having corresponding tiers of communication capabilities, and idle modes with little to no wireless connectivity. Within the various standby states, the network may have a reduced level of control over the various mobile stations throughout the cell.

In a particular example, in a conventional 3GPP UMTS network, one of the standby states is referred to as Cell_FACH. According to current specifications, the network is limited in that uplink transmissions from all the mobile stations in Cell_FACH throughout a cell must utilize the same kind of resources as one another. That is, all mobile stations in Cell_FACH within the cell are required to utilize the same transmission time interval for uplink transmissions on the E-DCH channel. This can result in a disadvantage, since some of the mobile stations in Cell_FACH may benefit from one transmission time interval, while other mobile stations in Cell_FACH may benefit from a different transmission time interval. Thus, there is a desire for increased flexibility in the assignment of resources to mobile stations for use in uplink transmissions.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide a capability for a single cell concurrently to deploy both 2 ms and 10 ms TTIs for uplink transmissions by UEs in an RRC state that does not have a dedicated channel (DCH) allocated to the UE, such as Cell_FACH. Further, some aspects of the present disclosure provide an option for UEs to transmit data on a legacy Rel-99 PRACH message in the non-DCH state.

In one aspect, the disclosure provides a method of wireless communication operable at a user equipment. Here, the method includes selecting a scrambling code adapted to indicate that the user equipment is capable of a flexible resource assignment, and transmitting an access attempt utilizing the selected scrambling code, the access attempt configured to indicate a preferred resource for use in an uplink data transmission.

Another aspect of the disclosure provides a method of wireless communication operable at a user equipment. Here, the method includes selecting a signature from among a plurality of signature sequences, the plurality of signature sequences being partitioned into at least a first set of signatures adapted to indicate a preference for a resource corresponding to a 2 ms transmission time interval for an uplink transmission, and a second set of signatures adapted to indicate a preference for a resource corresponding to a 10 ms transmission time interval for the uplink transmission, and transmitting an access attempt utilizing the selected signature.

Another aspect of the disclosure provides a method of wireless communication operable at a base station. Here, the method includes transmitting at least one list of common E-DCH resources for use by one or more user equipment, receiving an access attempt from a user equipment, the access attempt adapted to indicate a preferred resource, wherein the preferred resource comprises one of a Rel-99 PRACH resource or a common E-DCH resource according to the at least one list of common E-DCH resources, and transmitting an acquisition indicator adapted to indicate an assignment of resources comprising one of the preferred resource or a non-preferred resource.

Another aspect of the disclosure provides a user equipment configured for wireless communication. Here, the user equipment includes at least one processor, a memory operatively coupled to the at least one processor, and a transmitter operatively coupled to the at least one processor. The at least one processor is configured to select a scrambling code adapted to indicate that the user equipment is capable of a flexible resource assignment, and to transmit an access attempt utilizing the selected scrambling code, the access attempt configured to indicate a preferred resource for use in an uplink data transmission.

Another aspect of the disclosure provides a user equipment configured for wireless communication. Here, the user equipment includes at least one processor, a memory operatively coupled to the at least one processor, and a transmitter operatively coupled to the at least one processor. The at least one processor is configured to select a signature from among a plurality of signature sequences, the plurality of signature sequences being partitioned into at least a first set of signatures adapted to indicate a preference for a resource corresponding to a 2 ms transmission time interval for an uplink transmission, and a second set of signatures adapted to indicate a preference for a resource corresponding to a 10 ms transmission time interval for the uplink transmission, and to transmit an access attempt utilizing the selected signature.

Another aspect of the disclosure provides a base station configured for wireless communication. Here, the base station includes at least one processor, a memory operatively coupled to the at least one processor, and a transmitter operatively coupled to the at least one processor. The at least one processor is configured to transmit at least one list of common E-DCH resources for use by one or more user equipment, to receive an access attempt from a user equipment, the access attempt adapted to indicate a preferred resource, wherein the preferred resource comprises one of a Rel-99 PRACH resource or a common E-DCH resource according to the at least one list of common E-DCH resources, and to transmit an acquisition indicator adapted to indicate an assignment of resources comprising one of the preferred resource or a non-preferred resource.

Another aspect of the disclosure provides a user equipment configured for wireless communication. Here, the user equipment includes means for selecting a scrambling code adapted to indicate that the user equipment is capable of a flexible resource assignment, and means for transmitting an access attempt utilizing the selected scrambling code, the access attempt configured to indicate a preferred resource for use in an uplink data transmission.

Another aspect of the disclosure provides a user equipment configured for wireless communication. Here, the user equipment includes means for selecting a signature from among a plurality of signature sequences, the plurality of signature sequences being partitioned into at least a first set of signatures adapted to indicate a preference for a resource corresponding to a 2 ms transmission time interval for an uplink transmission, and a second set of signatures adapted to indicate a preference for a resource corresponding to a 10 ms transmission time interval for the uplink transmission, and means for transmitting an access attempt utilizing the selected signature.

Another aspect of the disclosure provides a base station configured for wireless communication. Here, the base station includes means for transmitting at least one list of common E-DCH resources for use by one or more user equipment, means for receiving an access attempt from a user equipment, the access attempt adapted to indicate a preferred resource, wherein the preferred resource comprises one of a Rel-99 PRACH resource or a common E-DCH resource according to the at least one list of common E-DCH resources, and means for transmitting an acquisition indicator adapted to indicate an assignment of resources comprising one of the preferred resource or a non-preferred resource.

Another aspect of the disclosure provides a computer program product operable at a user equipment, including a computer-readable storage medium having instructions for causing a computer to select a scrambling code adapted to indicate that the user equipment is capable of a flexible resource assignment, and instructions for causing a computer to transmit an access attempt utilizing the selected scrambling code, the access attempt configured to indicate a preferred resource for use in an uplink data transmission.

Another aspect of the disclosure provides a computer program product operable at a user equipment, including a computer-readable storage medium having instructions for causing a computer to select a signature from among a plurality of signature sequences, the plurality of signature sequences being partitioned into at least a first set of signatures adapted to indicate a preference for a resource corresponding to a 2 ms transmission time interval for an uplink transmission, and a second set of signatures adapted to indicate a preference for a resource corresponding to a 10 ms transmission time interval for the uplink transmission, and instructions for causing a computer to transmit an access attempt utilizing the selected signature.

Another aspect of the disclosure provides a computer program product operable at a base station, including a computer-readable storage medium having instructions for causing a computer to transmit at least one list of common E-DCH resources for use by one or more user equipment; instructions for causing a computer to receive an access attempt from a user equipment, the access attempt adapted to indicate a preferred resource, wherein the preferred resource comprises one of a Rel-99 PRACH resource or a common E-DCH resource according to the at least one list of common E-DCH resources, and means for transmitting an acquisition indicator adapted to indicate an assignment of resources comprising one of the preferred resource or a non-preferred resource.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure provide a capability for a single cell to deploy concurrently both 2 ms and 10 ms TTIs for uplink transmissions on the E-DCH channel by UEs in Cell_FACH. Further, some aspects of the present disclosure provide an option for UEs to transmit data on a legacy Rel-99 PRACH message in the Cell_FACH state. Still further aspects of the present disclosure provide for a network to override the UE's choice of the 2 ms or 10 ms TTI resource on the E-DCH or the Rel-99 PRACH message for any of various reasons.

Figure 1:
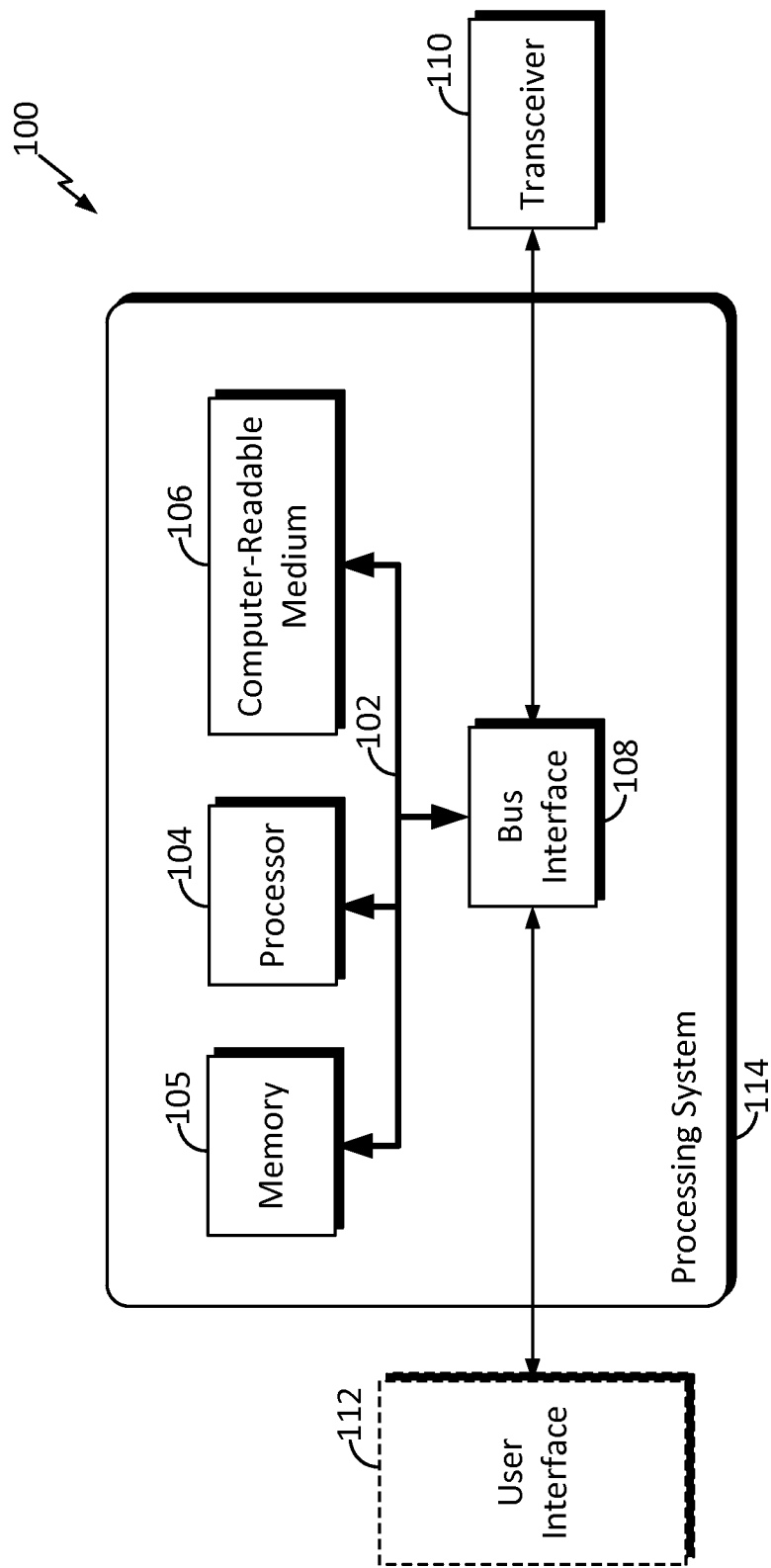
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
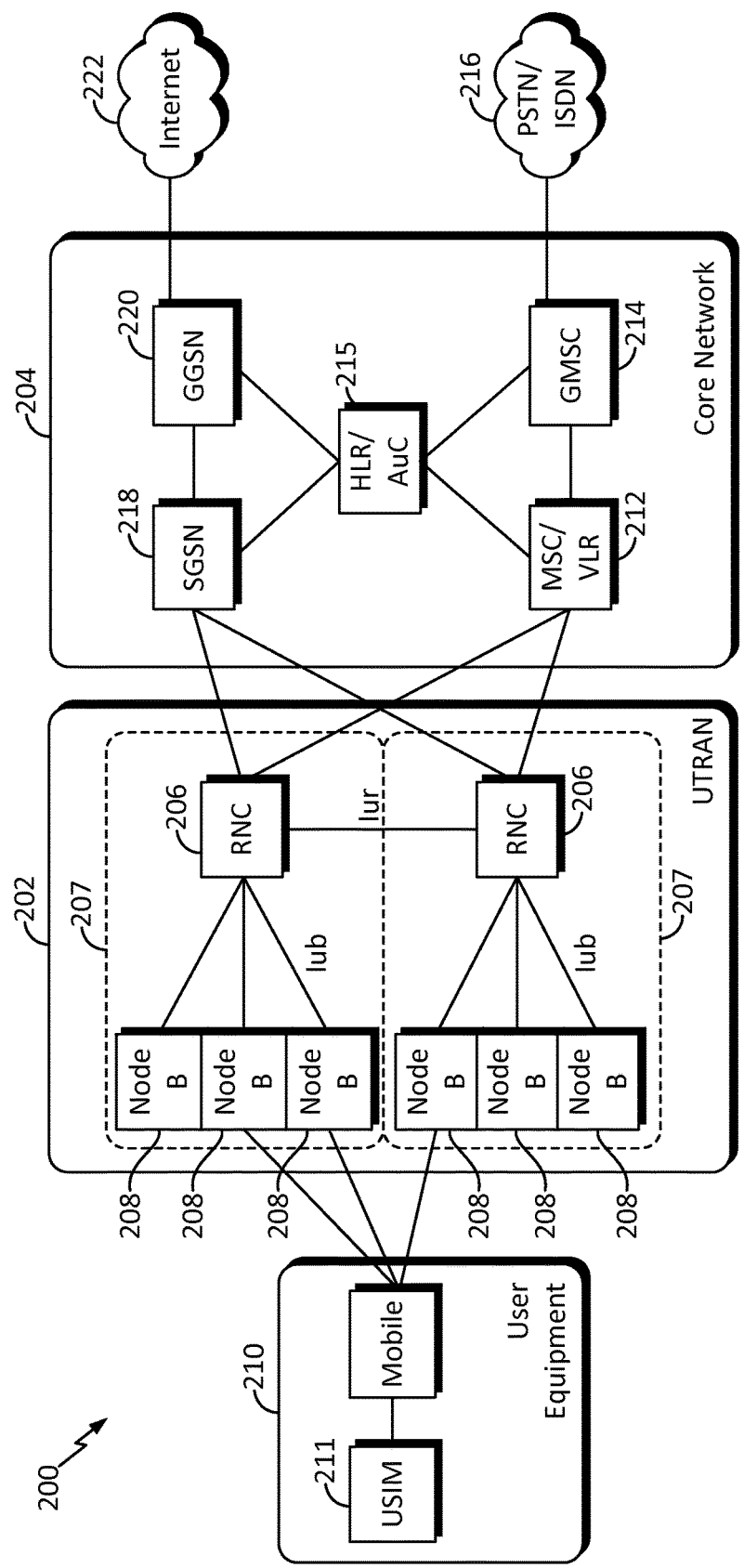
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
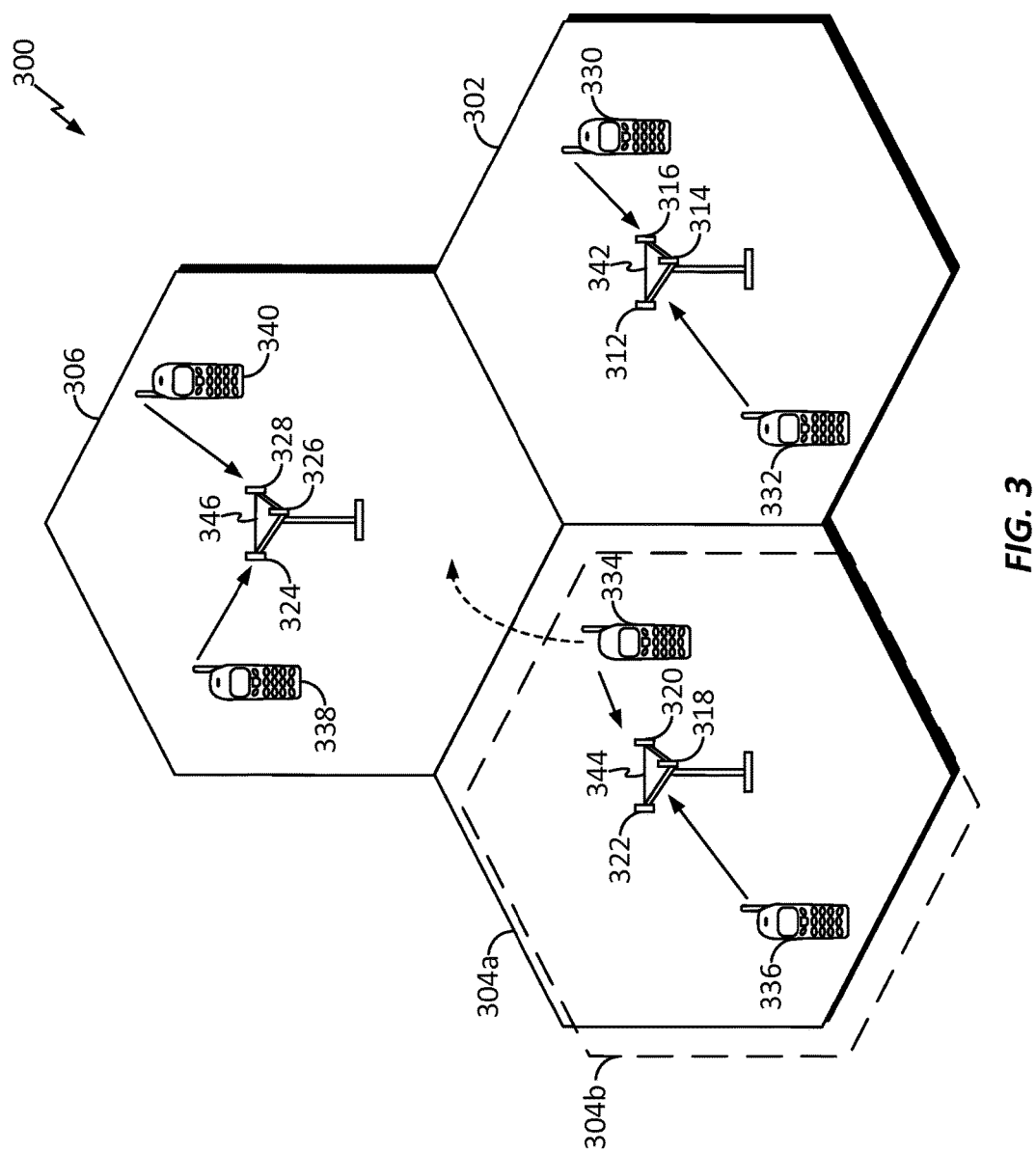
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 4:
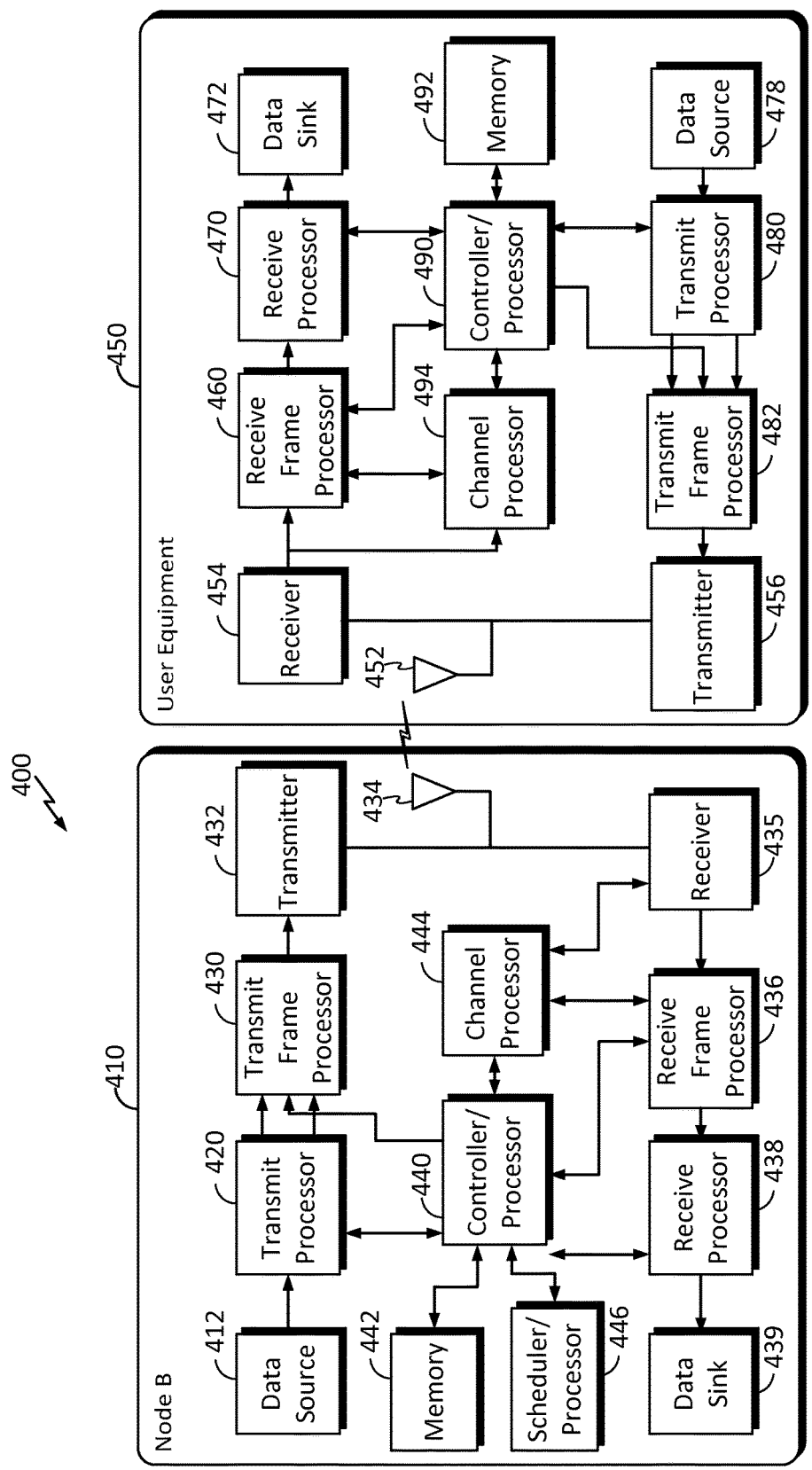
FIG. 4 is a block diagram conceptually illustrating an example of a Node B in communication with a UE in a telecommunications system.

FIG. 4 is a block diagram of an exemplary Node B 410 in communication with an exemplary UE 450, where the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

In any wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE and the core network, and may include circuit switched and packet switched protocols. The AS provides the lower layers, for signaling between the UTRAN and the UE, and may include a user plane and a control plane. Here, the user plane or data plane carries user traffic, while the control plane carries control information (i.e., signaling).

Figure 5:
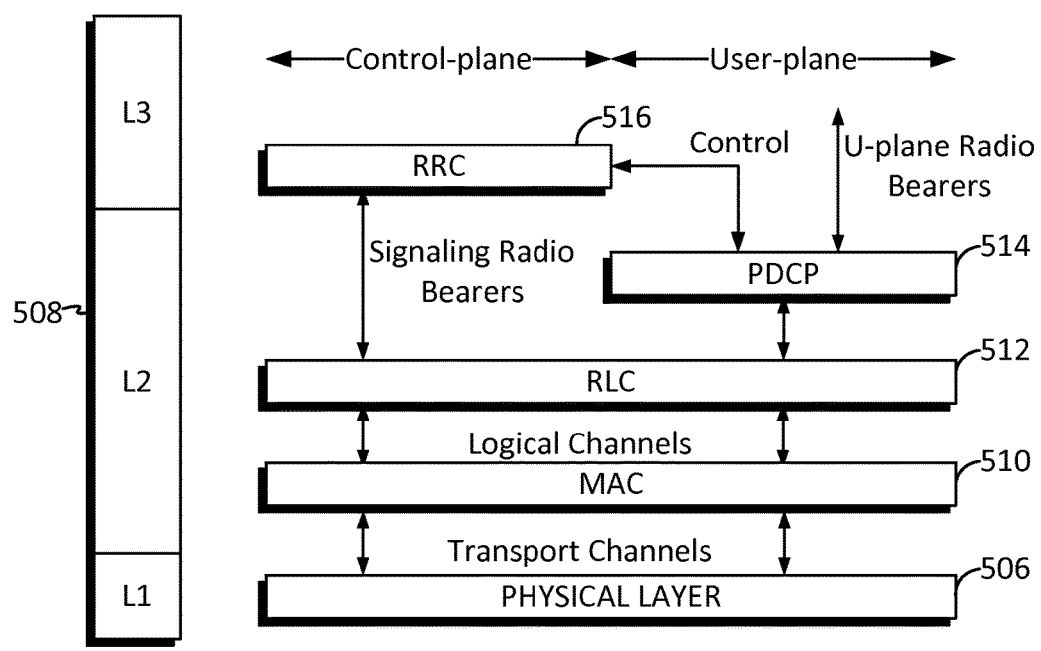
FIG. 5 is a conceptual diagram illustrating an example of a radio protocol architecture for the user and control plane.

Turning to FIG. 5, the AS is shown with three layers: Layer 1, Layer 2, and Layer 3. Layer 1 is the lowest layer and implements various physical layer signal processing functions. Layer 1 will be referred to herein as the physical layer 506. The data link layer, called Layer 2 508, is above the physical layer 506 and is responsible for the link between the UE and Node B over the physical layer 506.

At Layer 3, the RRC layer 516 handles the control plane signaling between the UE and the UTRAN. RRC layer 516 includes a number of functional entities for routing higher layer messages, handling broadcasting and paging functions, establishing and configuring radio bearers, etc.

As determined by the RRC layer 516, the UE can be in one of several RRC states. RRC states include an IDLE mode and a connected mode. The IDLE mode has the lowest energy consumption, while the connected mode includes several intermediate levels of stand-by states such as URA_PCH, Cell_PCH, and Cell_FACH. RRC connected mode further includes a Cell_DCH state, in which a dedicated channel is provided for highest rates of data transmission.

The UE can change its RRC state depending on call or connection activity, entering into lower and lower states when the UE is inactive. The stand-by states provide for different trade-offs between factors such as network capacity, call set-up times, battery time, and data speeds. The IDLE state saves battery power but provides little wireless connectivity.

In the illustrated air interface, the L2 layer 508 is split into sublayers. In the control plane, the L2 layer 508 includes two sublayers: a medium access control (MAC) sublayer 510 and a radio link control (RLC) sublayer 512. In the user plane, the L2 layer 508 additionally includes a packet data convergence protocol (PDCP) sublayer 514. Although not shown, the UE may have several upper layers above the L2 layer 508 including a network layer (e.g., IP layer) that is terminated at a PDN gateway on the network side and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs.

The RLC sublayer 512 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

A high speed packet access (HSPA) air interface includes a series of enhancements to the 3G/W-CDMA air interface between the UE 210 and the UTRAN 202 (referring again to FIG. 2), facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In an HSPA network, data generated at higher layers, all the way down to the MAC layer 510, are carried over the air through transport channels during an interval called a transmission time interval (TTI). A TTI is a time length of an encapsulated packet that is independently decodable by a receiver of that packet. In a wireless communication system, higher layers pass packets to lower layers being sized to fit into the TTI.

3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding downlink packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the channel quality indicator (CQI) and precoding control information (PCI).

3GPP Release 6 specifications introduced uplink enhancements referred to as Enhanced Uplink (EUL) or High Speed Uplink Packet Access (HSUPA). EUL utilizes as its transport channel the EUL Dedicated Channel (E-DCH). The E-DCH is transmitted in the uplink together with the Release 99 DCH.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Compared to the DCH that is utilized in previous W-CDMA systems (e.g., Rel-99), the E-DCH offered significantly higher data capacity and data user speeds on the uplink through the use of a scheduled uplink with shorter TTIs (as low as 2 ms). That is, the shorter TTIs can enable reduced delays, increased granularity in the scheduling process, and better tracking of the time-varying channel conditions. Prior implementations utilized a minimum 10 ms TTI. The 2 ms TTI is generally only implemented when signal conditions are favorable or when the UE has available power headroom for uplink transmissions, as the 10 ms TTI provides for improved coverage. Moreover, if a UE is coverage limited or has limited power headroom, the 10 ms TTI would be more favorable.

As described above, one of the RRC states for a UE 450 in a UMTS network is called Cell_FACH, in which the UE continuously monitors the forward access channel (FACH, used for transmissions of relatively small amounts of data) on the downlink, but there is no dedicated physical channel allocated to the UE. While in the Cell_FACH state, uplink transmissions are allowed by a UE following a random access procedure, as described below.

A conventional random access procedure, which may be initiated while a UE is in the Cell_FACH state, is largely managed by the MAC entities 510 at the UE 450 and the Node B 410. As described below, the random access procedure utilizes, among others, channels including the BCH, RACH, and AICH.

The broadcast channel (BCH) is a transport channel transmitted by a Node B 410, which carries broadcasted information directed to any mobile in listening range. The broadcasted information may be specific to a particular cell or may concern the network. Among other information, the broadcasted information may include a list of available RACH sub-channels and available scrambling codes and signatures for RACH use.

The random access channel (RACH) is a transport channel generally used by a UE 450 to carry an access attempt and initiate a call with the network, or to register a terminal to the network after powering on, or for performing a location update after moving from one location to another. That is, the RACH can provide common uplink signaling messages, and also can carry dedicated uplink signaling and user information from a UE operating in a Cell_FACH state. At the physical layer, the RACH maps to the physical random access channel (PRACH).

The PRACH, transmitted by the UE 450, includes a preamble that is transmitted before data transmission on that channel. The PRACH preamble contains a signature sequence of 16 symbols which, combined with a spreading sequence having a spreading factor of 256, results in a PRACH preamble with a length of 4096 chips.

The acquisition indicator channel (AICH) is transmitted by the Node B 410 to indicate the reception of the access attempt. That is, once the Node B 410 detects a PRACH preamble, the Node B 410 generally transmits the AICH including the same signature sequence as used on the PRACH. The AICH generally includes an information element called the acquisition indicator (AI), which may include a positive acknowledgment (ACK) or a negative acknowledgment (NACK) indicating an acceptance or a rejection of the received access attempt. The AICH may further include an extended acquisition indicator (E-AI), as described in further detail below, for providing resource allocation information to the UE in addition to the positive or negative acknowledgment.

Figure 6:
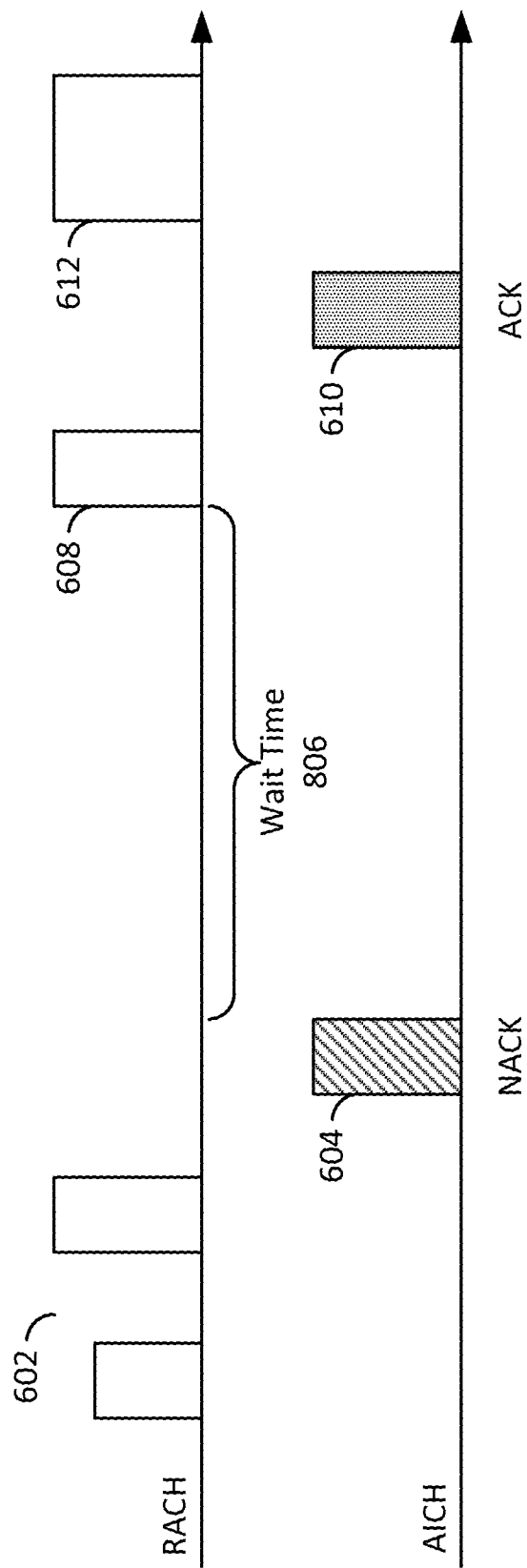
FIG. 6 is a conceptual diagram illustrating a random access procedure.

FIG. 6 illustrates a typical random access procedure in a UTRA network in accordance with 3GPP Release-99 specifications (referred to herein as a Rel-99). Here, the random access procedure begins with a UE 450 decoding the BCH to determine the available RACH sub-channels and their scrambling codes and signatures. The UE 450 may then randomly select one of the RACH sub-channels from among the group of sub-channels that the UE is allowed to use. The signature may also be selected randomly from among the signatures available.

After setting the initial PRACH preamble transmit power level, the UE 450 transmits the PRACH preamble 602 with the selected scrambling code and signature. In the illustration of FIG. 6, the PRACH preamble includes two transmissions with a ramping of the power in each transmission not acknowledged by the network. When the PRACH preamble 602 is detected, the Node B 410 may respond with an acquisition indicator (AI) 604 indicating a negative acknowledgment on the AICH. Here, the UE 450 stops its transmission, re-trying again later (if the number of access attempts corresponding the persistence value has not been exhausted) after waiting for a wait time 606 equal to a selected back-off period. After waiting, if the number of attempts allowed according to the persistence value for the UE 450 has not been exhausted, the UE 450 may transmit a subsequent PRACH preamble 608 on the PRACH. In this instance, the access attempt is met with a positive acknowledgment 610 transmitted by the Node B 410 on the AICH. Here, the AICH includes the same signature sequence transmitted by the UE. Once the UE 450 detects the AICH acknowledgment, it may transmit the message part 612 of the RACH transmission. That is, when a legacy Rel-99 UE is in the Cell_FACH state, uplink data, at a relatively low data rate, may be transmitted utilizing a Rel-99 PRACH message.

This Rel-99 PRACH message can be useful for signaling small amounts of user data. However, since the data rate is typically below 10 kbps, it has been desired to enable use of the HSPA transport and physical channels in the Cell_FACH state to improve performance. For this and other reasons, more recent specifications introduced the Enhanced RACH.

Enhanced RACH, defined in Release 8 specifications, enabled E-DCH resources to be utilized by a UE for uplink transmissions while in Cell_FACH. Transmission on the E-DCH provides a higher data rate than that available utilizing a Rel-99 PRACH message, at the expense of a larger amount of power required to make the transmission.

To enable Enhanced RACH, certain aspects of the Rel-99 random access procedure described above and illustrated in FIG. 6 are modified. For example, the E-DCH resources to be used in Cell_FACH are broadcast to all UEs in the cell on the BCH. UEs that are capable of Enhanced RACH can decode this resource list for use in a subsequent access attempt.

In a UE capable of Enhanced RACH, the transmission of the PRACH preamble 602, 608 includes a preamble signature configured to indicate that the UE seeks to transmit an E-DCH transmission. In response, the Node B may transmit a corresponding AI or E-AI (604, 610) configured to indicate E-DCH resources allocated to the UE. Here, the E-AI is an extended acquisition indicator that, according to Release 8 or later 3GPP specifications including 3GPP TS 25.214, may provide E-DCH resource configuration information for a UE to utilize in an uplink transmission in the Cell_FACH state.

Thus, under Enhanced RACH, rather than transmitting the RACH message 612 as described above, the UE transmits uplink data utilizing the E-DCH, using the resources indicated on the AICH transmission to be available to the UE.

While the Enhanced RACH procedure provides benefits over the Rel-99 RACH procedure, certain disadvantages remain. For example, uplink transmissions on the E-DCH utilize more power from the UE relative to transmissions on the RACH, which can adversely affect the battery life of a mobile device.

Moreover, for UEs in Cell_FACH, common E-DCH resources for the entire cell are configured for either the 2 ms TTI or the 10 ms TTI. That is, within one cell it is not conventionally a possibility to have some UEs in the Cell_FACH state use the 2 ms TTI, while other UEs in the Cell_FACH state use the 10 ms TTI. This restriction can adversely affect coverage of all UEs in Cell_FACH.

That is, for the sake of ensuring larger RACH coverage, a network may be inclined to configure all the common E-DCH resources on the 10 ms TTI. This configuration results in a data rate limitation on UEs that have a large transmit power headroom, depriving them the high data rate and low latency benefits of 2 ms TTI.

On the other hand, if the network were to configure all the common E-DCH resources with the 2 ms TTI, then UEs with a low power headroom would not avail the benefits of improved coverage performance due to 10 ms TTI.

Further, for UEs capable of EUL, current specifications do not allow a conventional transmission of data on a legacy Rel-99 PRACH message. However, in some cases, if there is only a small amount of data to send it may be costly in terms of power usage to transmit on the E-DCH, and instead, the UE could beneficially transmit on a legacy Rel-99 PRACH message.

Therefore, various aspects of the present disclosure provide a capability for a single cell to deploy concurrently both 2 ms and 10 ms TTIs for uplink transmissions by UEs in Cell_FACH. Further, some aspects of the present disclosure provide an option for UEs to transmit data on a legacy Rel-99 PRACH message in the Cell_FACH state.

Moreover, various aspects of the present disclosure provide these capabilities in other RRC states beyond merely the Cell_FACH state. That is, while the random access procedures described in detail herein refer to the Cell_FACH state, one having ordinary skill in the art will comprehend that the procedures can equally be applied to UEs in other non-DCH RRC states such as URA_PCH, Cell_PCH, or even in Idle mode.

To enable these capabilities, backwards compatibility with legacy UEs may be desired. Here, "legacy UEs" may refer to UEs capable of communicating in a cell according to 3GPP Release 8 (hereinafter, "Rel-8") specifications. In addition, "legacy UEs" may refer to UEs configured according to any 3GPP release, prior to Release 11 specifications. Thus, signaling transmitted to the cell may be configured such that legacy UEs in the cell may continue to utilize a random access procedure for uplink transmissions in accordance with their specified procedures, e.g., utilizing the Rel-99 PRACH or the Enhanced RACH as described above. Moreover, UEs configured in accordance with the present disclosure may be enabled to receive configuration enabling selection among the Rel-99 PRACH message; the Rel-8 common E-DCH according to the Enhanced RACH procedure; the Rel-11 common E-DCH with a 10 ms TTI; and the Rel-11 common E-DCH with a 2 ms TTI.

Figure 7:
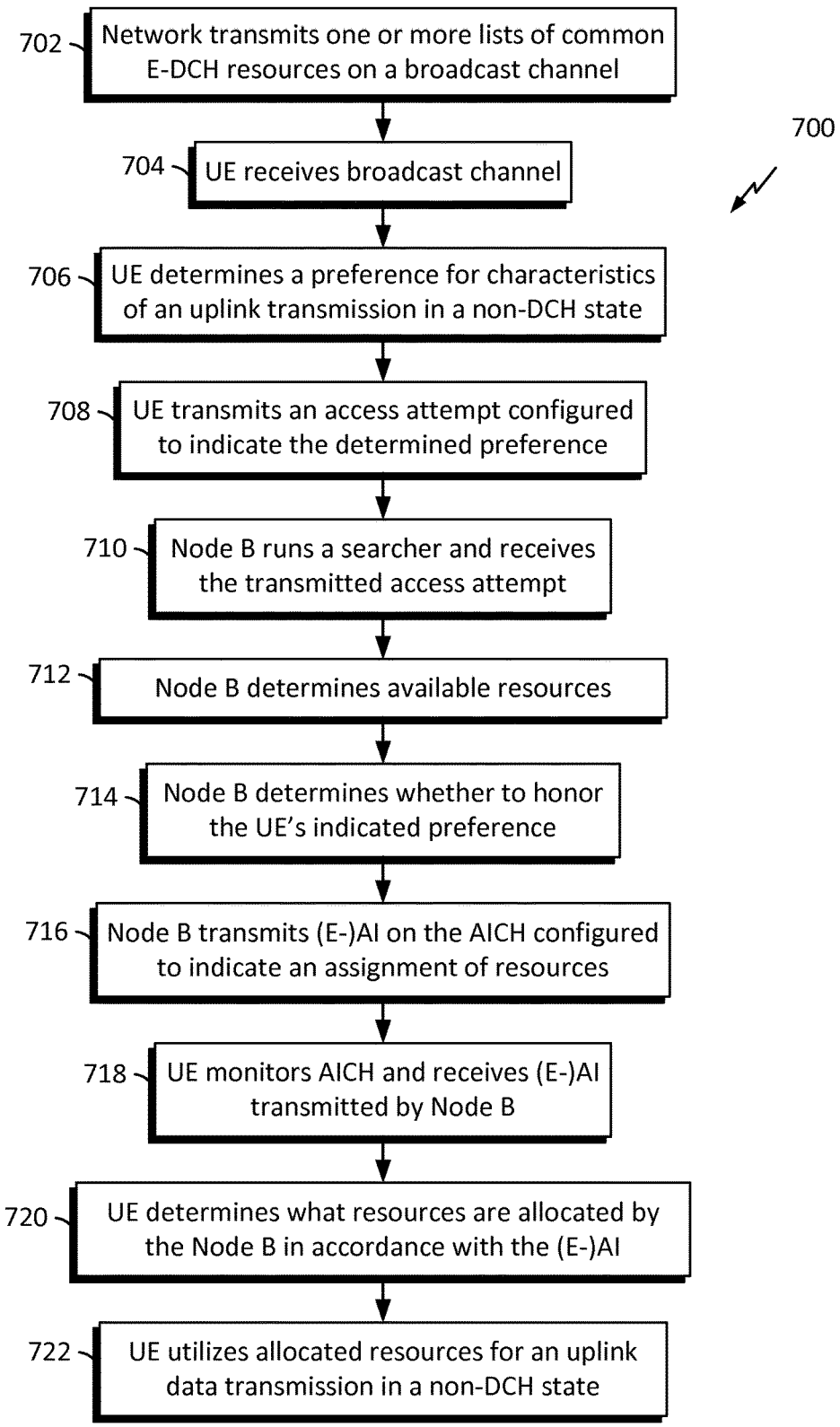
FIG. 7 is a flow chart illustrating an exemplary process for requesting and assigning resources to user equipment for uplink transmissions in a wireless communication system.

FIG. 7 is a flow chart illustrating an exemplary process 700 operable at a UE 450 for enabling a random access procedure for UEs in Cell_FACH or another suitable non-DCH state, enabling concurrent deployment of 2 ms and 10 ms TTIs for uplink transmissions on the E-DCH. In some examples, the process 700 may further enable utilization of a Rel-99 PRACH transmission by UEs in the Cell_FACH or other suitable non-DCH state.

In accordance with various aspects of the present disclosure, the process 700 may be implemented by the Node B 410 and/or the UE 450 (referring to FIG. 4). In accordance with another aspect of the present disclosure, the process 700 may be implemented by the processing system 114 (referring to FIG. 1). In accordance with another aspect of the present disclosure, the process 700 may be implemented by any suitable processor, apparatus, or means for performing the recited functions.

In block 702, the UTRAN (e.g., the RNC 206, referring to FIG. 2) may transmit one or more lists of common uplink resources. Here, the transmission may be made on a broadcast channel such as the BCH, which is a shared channel that any one or more UEs in listening range of the cell may receive. With this broadcast, the cell can communicate to the one or more UEs what resources are available for use for uplink transmissions on the E-DCH. These uplink resources typically include a list of common E-DCH resources that can be used for uplink traffic in Cell_FACH. Further, the cell may communicate to the UEs what resources are available for Rel-99 PRACH use.

In one example, the broadcast may include a first list accessible to legacy UEs that indicates one of either 2 ms or 10 ms TTIs (e.g., corresponding to the conventional Enhanced RACH procedure described above), and a second list accessible to UEs configured according to the present disclosure. Here, the second list may include a plurality of sets of common E-DCH resources: a first set including 2 ms TTIs; a second set including 10 ms TTIs; and optionally, a third set including resources available for Rel-99 PRACH transmissions. In a further aspect of the disclosure, the network may be provided an option not to broadcast the second list. In this case, the behavior of the UE would fall back to be essentially the same as the legacy UE, i.e., utilizing resources advertised on the first list only, which would be uniformly a single TTI length across the cell.

When utilizing the second list of common E-DCH resources, the size of any of the sets in the second list may optionally be set to zero. In this way, the network can have the flexibility to advertise common E-DCH resources corresponding to only one of the values, e.g., 2 ms or 10 ms TTIs, on the second list for utilization by the UEs configured according to the present disclosure.

That is, the first list, which is accessible to legacy UEs, might be set to a first TTI length, and the second list, which is exclusively accessible to UEs 450 configured in accordance with the present disclosure, might be set to a second TTI length. In this way, when a UE 450 makes an access attempt requesting resources on the first list, the network may treat that UE 450 as a legacy UE; and when the UE 450 makes an access attempt requesting resources on the second list, the network would know that the UE 450 is configured in accordance with the present disclosure and is capable of flexible resource assignment.

In a particular example, the first list, accessible to legacy UEs, may be set to broadcast 10 ms TTIs, and the second list may be set to broadcast 2 ms TTIs. In this example, if a UE 450 configured according to the present disclosure were to make an access attempt utilizing the first list to request the 10 ms TTI, the network would not necessarily have any manner to determine that the UE 450 is configured according to the present disclosure, capable of flexibly utilizing either the 2 ms or the 10 ms TTI. Thus, the network would treat the UE 450 as a legacy UE, and would assign resources as available according to the request. On the other hand, if the UE were to make an access attempt utilizing the second list to request the 2 ms TTI, by virtue of utilizing the second list, of which the legacy UEs would not be aware, the network would be enabled to determine that the UE 450 is configured in accordance with the present disclosure, and capable of a flexible assignment of resources utilizing either the 2 ms or the 10 ms TTI. In this case (as described in further detail below), the network may honor the UE's request and assign resources utilizing the 2 ms TTI, or the network may override the UE's request and assign resources utilizing the 10 ms TTI.

Here, it may be possible to populate the first list, accessible to legacy UEs, to broadcast 2 ms TTIs, while the second list broadcasts 10 ms TTIs. However, if the UE 450 configured according to the present disclosure requested the 10 ms TTI, the reason for that request is likely due to power headroom limitations. That is, as discussed above, the 2 ms TTI is generally only implemented when signal conditions are favorable or when the UE has available power headroom for uplink transmissions. In this case, if the UE 450 requested the 10 ms TTI, it may not make sense to override this request and instead to assign the UE 450 with the 2 ms TTI. That is, the UE 450 may not have sufficient power headroom to utilize the 2 ms TTI. Thus, having the first, legacy list broadcasting 2 ms TTIs and the second list broadcasting 10 ms TTIs may not bring the advantages of flexibility in resource assignment to UEs that request the 10 ms TTI.

In a further aspect of the present disclosure, the broadcast in block 702 may include information corresponding to a PRACH partition between two or more of the Rel-99 PRACH, the Rel-8 common E-DCH resources, and the Rel-11 2 ms TTI and the 10 ms TTI common E-DCH resources. The PRACH partition is described in further detail below.

At block 704, the UE 450 may receive the broadcast transmitted by the Node B in block 702. Having the list of common E-DCH resources, and the PRACH partition between the Rel-99 PRACH, the Rel-8 common E-DCH resources, and the Rel-11 2 ms TTI and 10 ms TTI common E-DCH resources, the UE 450 may be enabled to transmit an access attempt, as described below, configured to indicate a preference for characteristics of an uplink transmission in a non-DCH state, such as Cell_FACH. For example, the UE 450 may be enabled to indicate, in the access attempt, a preference to utilize a Rel-99 PRACH message, or an E-DCH transmission utilizing either of a 2 ms or a 10 ms TTI.

At block 706, the UE 450 may determine a preference for a characteristic of the uplink transmission in the non-DCH state. For example, the UE 450 in Cell_FACH may select among one or more candidates including the Rel-99 PRACH message, an E-DCH message utilizing a 2 ms TTI, or an E-DCH message utilizing a 10 ms TTI.

As described above, each of these uplink transmission formats has different advantages and disadvantages. For example, in a UE that is configured to allow transmission on the Rel-99 PRACH message, this message can utilize less energy than transmission on the E-DCH, but provides a lower bit rate. Thus, to save energy, such a UE may select the Rel-99 PRACH message when the amount of data to transmit is very small. If the amount of data to transmit is relatively large, then the natural choice would be to utilize the common E-DCH resources for the uplink transmission. In this case, or in a UE that is not configured to allow Cell_FACH transmission on the Rel-99 PRACH message, the UE may select between the 2 ms and 10 ms TTI.

In an aspect of the present disclosure, selection between the 2 ms and 10 ms TTI may be based upon factors such as signal conditions and/or the power headroom of the UE 450. That is, as described above, a UE experiencing poor signal conditions and/or with limited power headroom would beneficially select the 10 ms TTI, since this format provides improved coverage within the cell. However, a UE experiencing good signal conditions and/or having greater available headroom may wish to select the 2 ms TTI to avail itself of the various benefits of the shorter TTI.

Fortunately, the existing conventional PRACH procedure (e.g., as specified in Rel-8) includes the determination of a value denoted as Preamble_Initial_Power, which is the power for the UE 450 to utilize in its first PRACH preamble transmission 602 (see FIG. 6). Here, the value of Preamble_Initial_Power is determined in accordance with a received pilot power from the cell and an amount of uplink interference detected by the UE 450. Thus, in some aspects of the present disclosure, this Preamble_Initial_Power can be re-used as a factor to select between the 2 ms and 10 ms TTI. That is, if the value of the calculated Preamble_Initial_Power is high, this can imply that the UE 450 has limited power headroom and the UE 450 may accordingly select the 10 ms TTI; otherwise, if the value of Preamble_Initial_Power is low, the UE 450 may select the 2 ms TTI.

Figure 8:
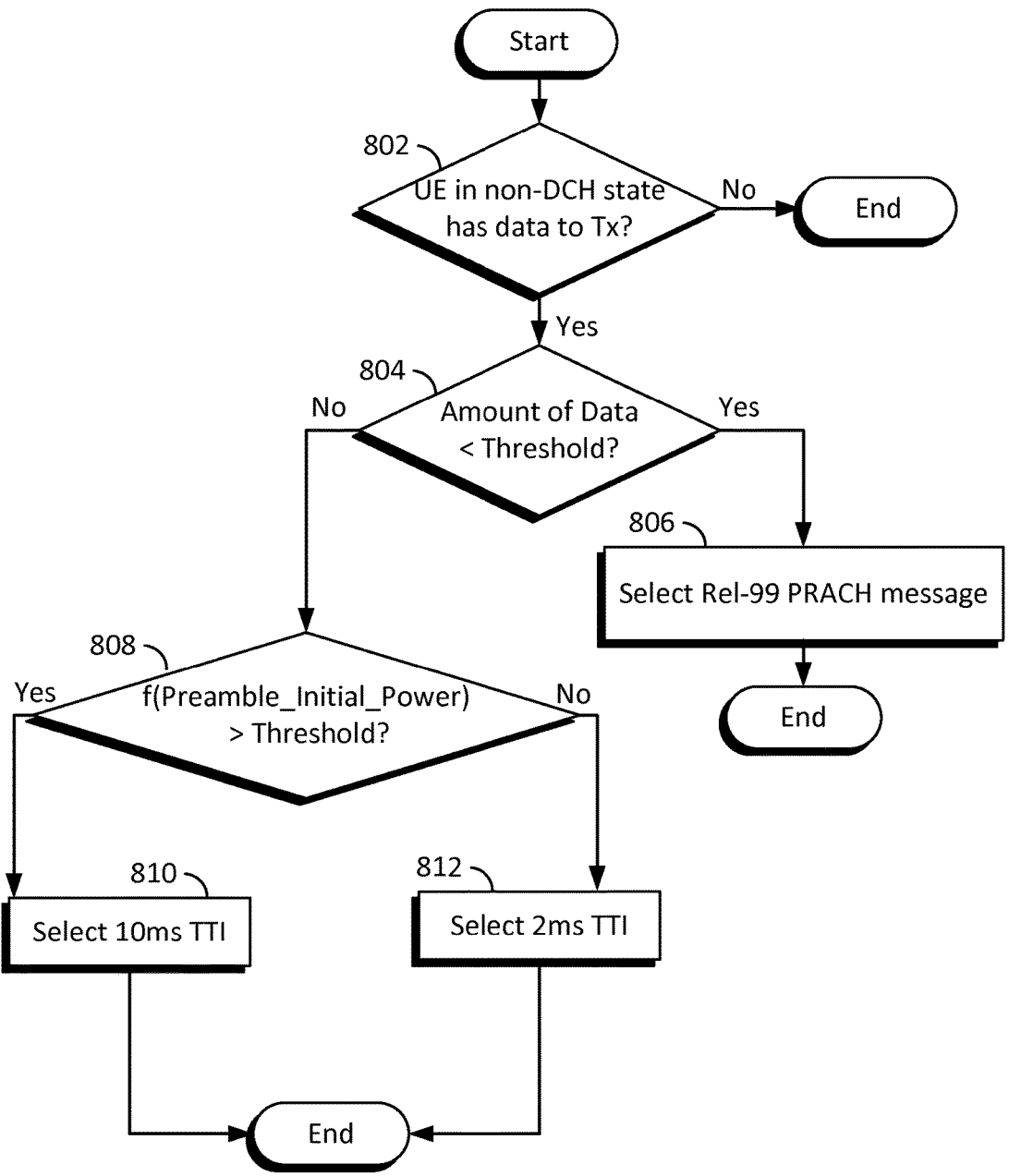
FIG. 8 is a flow chart illustrating an exemplary process operable at a user equipment for selecting a preferred resource for an uplink transmission.

FIG. 8 is a flow chart illustrating an exemplary process 800 for a UE (e.g., the UE 450) to select characteristics of an uplink transmission in a non-DCH state such as Cell_FACH in accordance with some aspects of the present disclosure. Here, the process 800 may correspond to block 706 of FIG. 7, providing additional details therein.

At block 802, the process may determine whether a UE 450 in a non-DCH state such as Cell_FACH has data to transmit on an uplink transmission. If no, then the process ends; but if yes, then at block 804, the process may determine whether that data is of an amount that is less than a data threshold. In some examples, the data threshold may be signaled to the UE 450 by the network, e.g., being broadcasted on a system information block (SIB). In other examples, the data threshold may be pre-programmed in the UE 450 (e.g., being stored in a memory 492), or any other suitable predetermined data threshold may be utilized. Here, if the amount of data is less than the data threshold, then in block 806 the UE 450 may select the Rel-99 PRACH message to utilize for the uplink transmission.

If, on the other hand, the amount of data is not less than the data threshold, then the process may proceed to block 808, wherein the process may determine whether a function of an initial transmit power (e.g., the Preamble_Initial_Power described above) is greater than a power threshold. Here, the function of the initial transmit power may be any suitable function of the initial transmit power, including but not limited to the initial transmit power itself, a difference between or sum of the initial transmit power and some other power value, etc. Similar to the data threshold discussed above with respect to block 804, the power threshold utilized in block 808 may be signaled to the UE 450 by the network, e.g., by being broadcasted on a system information block (SIB). In other examples, the power threshold may be pre-programmed in the UE 450, or any other suitable predetermined power threshold may be utilized. Here, if the function of the initial transmit power is greater than the power threshold, then in block 810 the process may select the 10 ms TTI. On the other hand, if the function of the initial transmit power is not greater than the power threshold, then in block 812 the process may select the 2 ms TTI.

In some aspects of the present disclosure, a UE 450 undertaking process 800 may only select between the 2 ms and 10 ms TTI. That is, the portion of the process from block 804 to block 806, relating to a potential selection of the Rel-99 PRACH message, is optional. In such an example, after block 802, after determining that the UE in the non-DCH state has data to transmit, the process may proceed directly to block 808 to select between the 2 ms and the 10 ms TTI.

Returning now to FIG. 7, once the UE 450 has determined in block 706 (as described above in relation to FIG. 8) the preference of characteristics of the uplink transmission, the process may proceed to block 708 wherein the UE 450 transmits an access attempt configured to indicate the determined preference. In accordance with an aspect of the present disclosure, the access attempt may be configured to indicate the determined preference by partitioning the set of PRACH preamble scrambling codes, by partitioning the set of signature sequences utilized on a particular scrambling code, or by utilizing a combination of the above.

Figure 9:
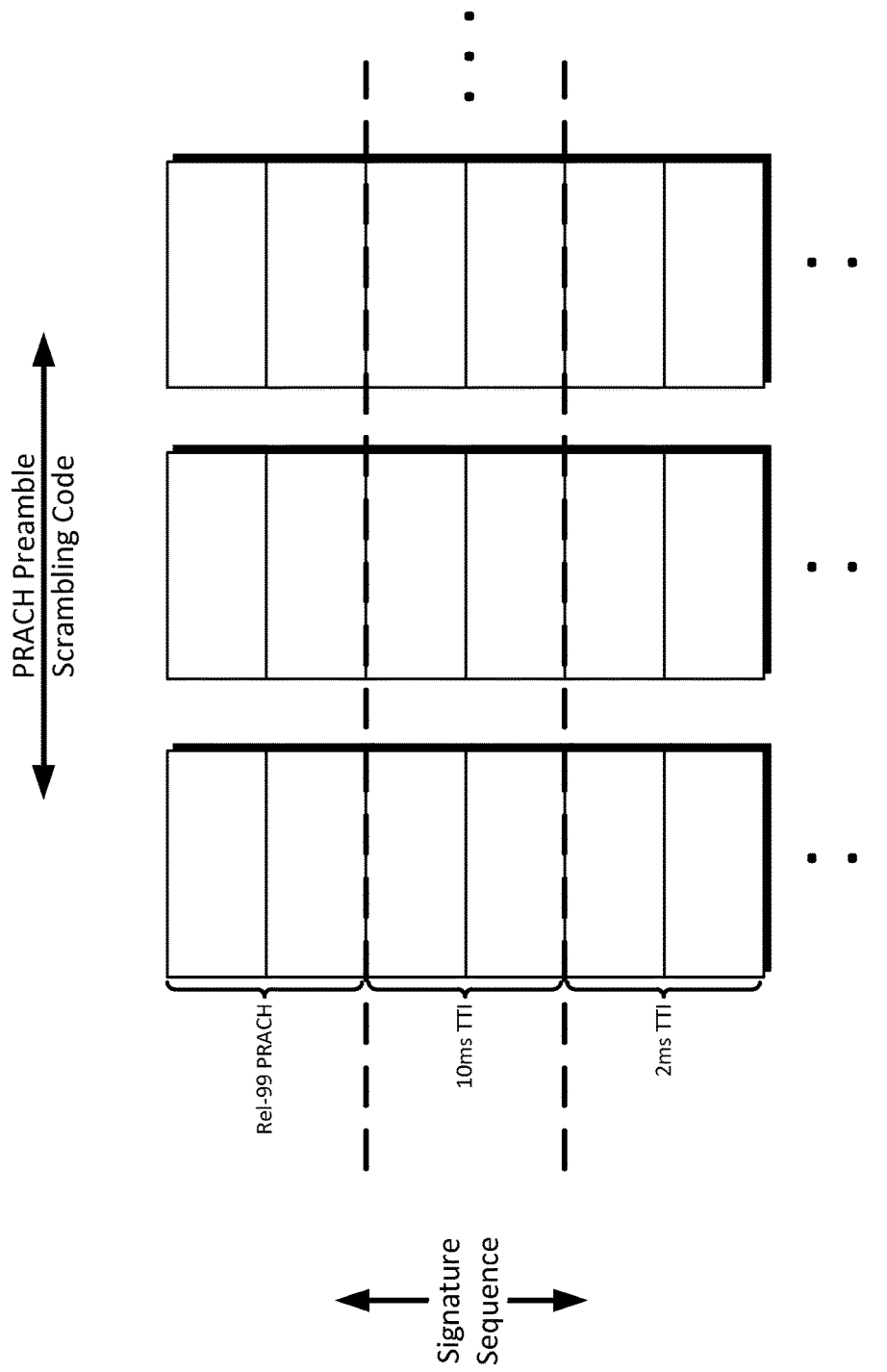
FIGS. 9-12 are schematic diagrams illustrating the use of partitioned PRACH preamble scrambling codes and/or signature sequences to indicate a preferred resource for an uplink transmission.
Figure 10:
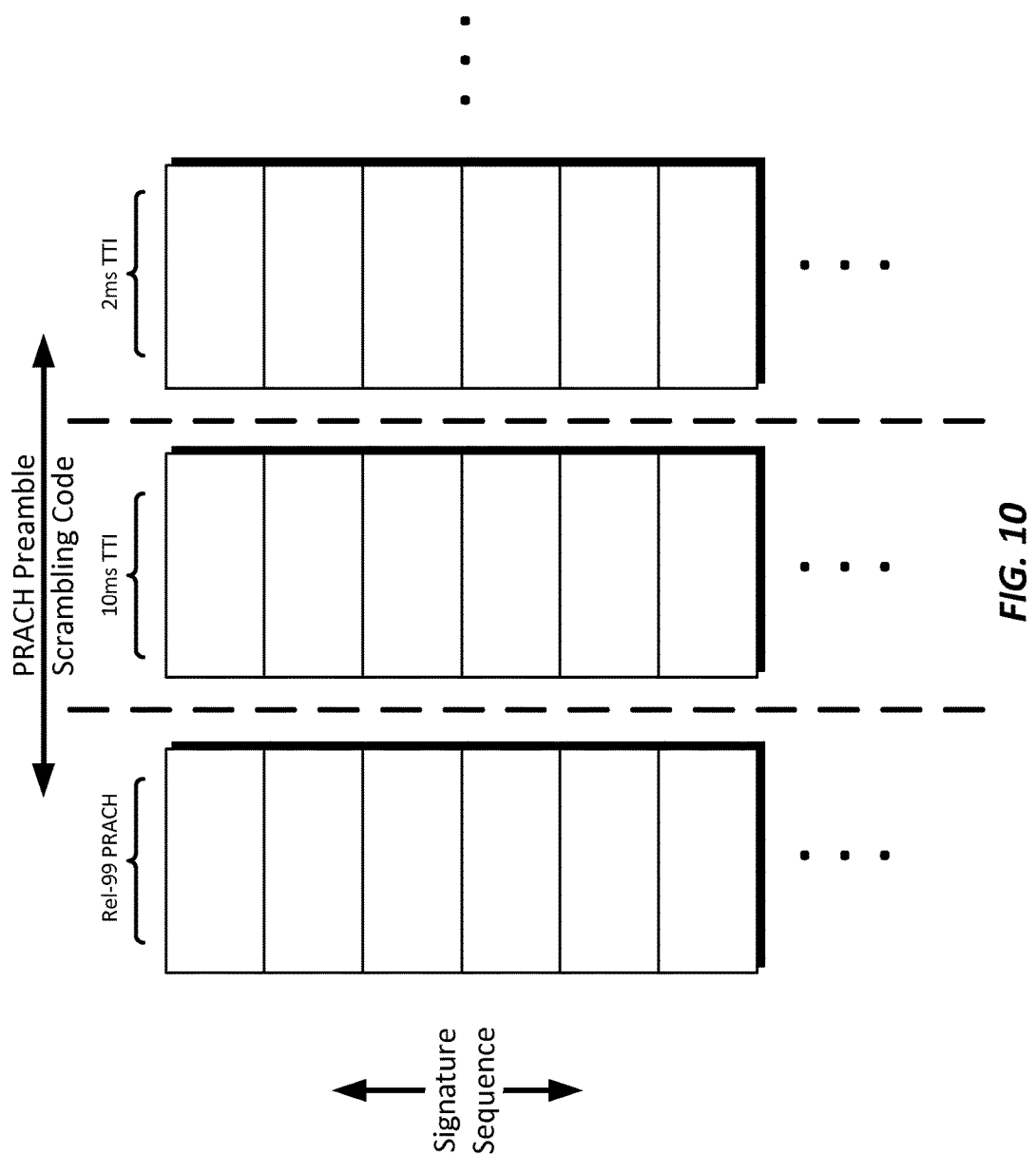
Figure 11:
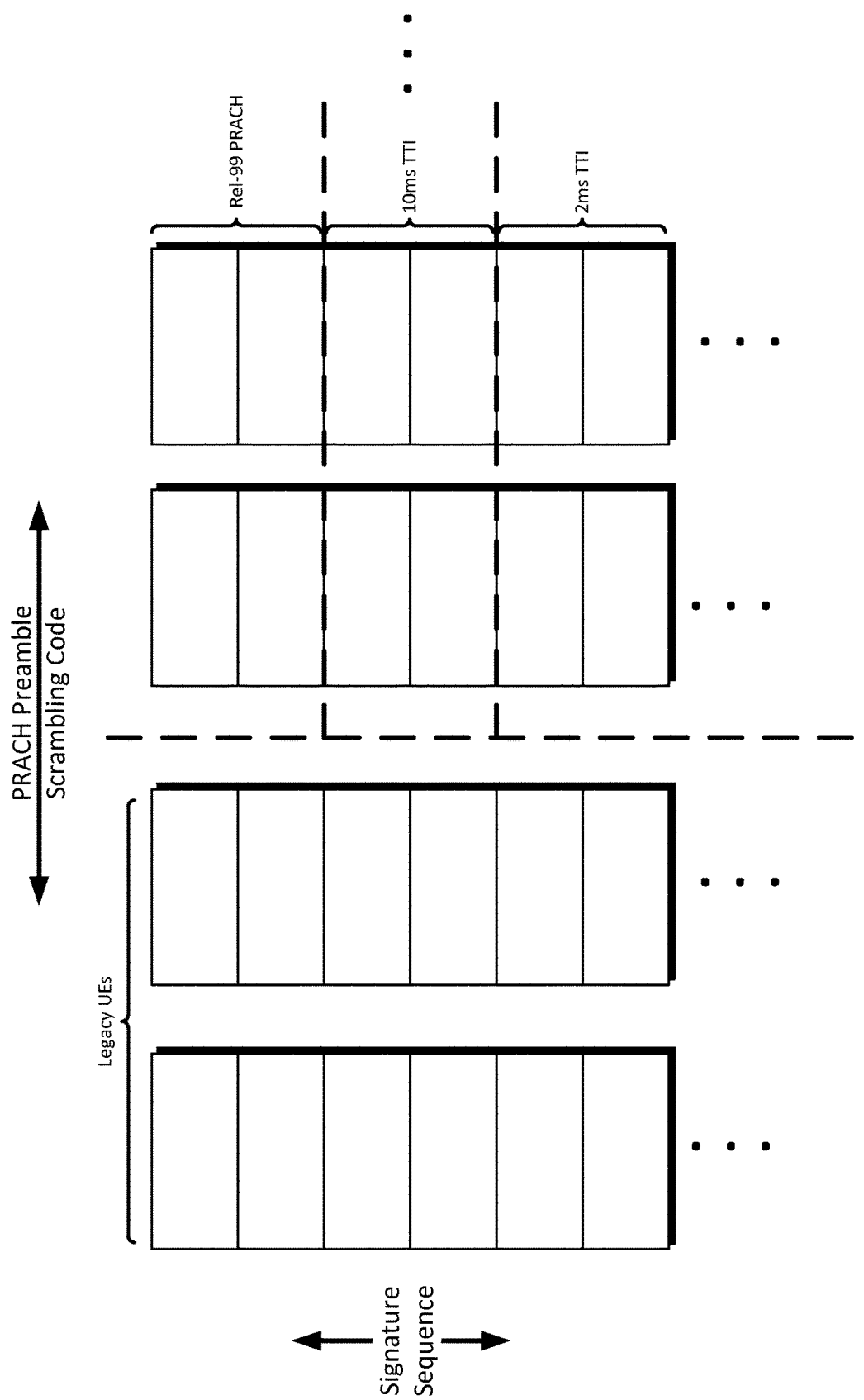
Figure 12:
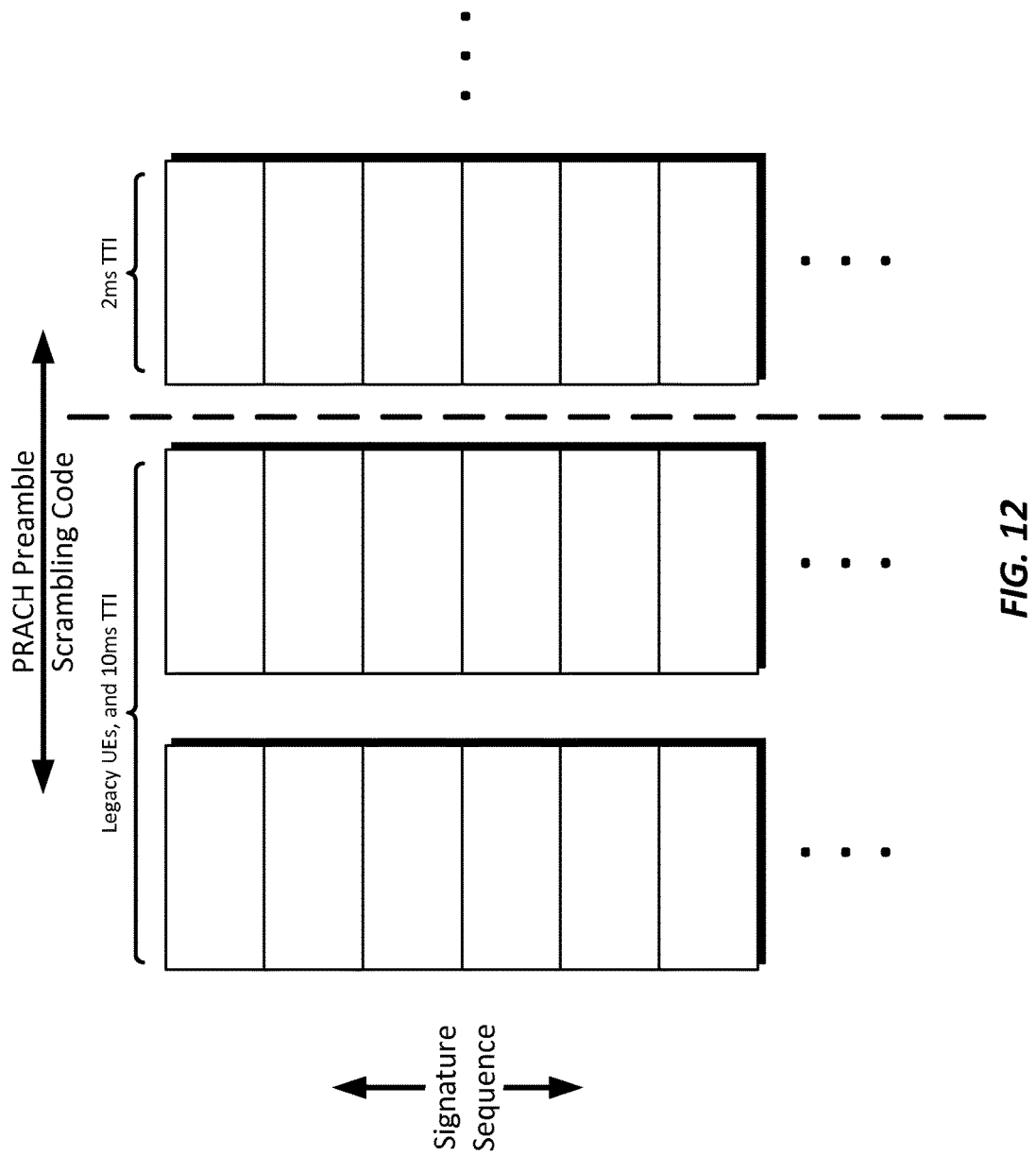

FIGS. 9-12 are schematic illustrations demonstrating some examples of how the PRACH preamble may be configured to indicate the determined preference for the uplink transmission format. That is, the PRACH preamble 602, described above with relation to FIG. 6, is generally transmitted by the UE 450 utilizing a scrambling code selected from among a set of available scrambling codes. In FIGS. 9-10 and 12, three different scrambling codes are illustrated; and in FIG. 11, four different scrambling codes are illustrated; however, in any particular example any suitable number of scrambling codes may be included in the set of available scrambling codes. Further, in addition to the scrambling code, the PRACH preamble 602 is further modulated by a signature selected from among a set of available signatures. In each of FIGS. 9-12, each scrambling code is shown having a signature space including six signatures. However, in any particular example any suitable number of signatures may be included in the set of available signatures for each scrambling code.

The correspondence between a particular preference for the uplink transmission format and a particular scrambling code-signature sequence selection may be set in the UE 450 in accordance with the one or more lists of common uplink resources transmitted to the UE as described above in relation to blocks 702 and 704. That is, the information transmitted to the UE 450 on the broadcast channel may correspond to the partition of the PRACH preamble scrambling code and/or signature space, such that the UE's selection of a preferred uplink transmission format can utilize this received information to select a corresponding PRACH preamble and/or signature partition.

For example, in the example illustrated in FIG. 9, the signature space is partitioned into three partitions, each partition corresponding to one of the Rel-99 PRACH message, the 10 ms TTI, or the 2 ms TTI. Here, each partition includes two signatures out of the signature space; however, in various examples according to aspects of the present disclosure, any suitable number of signatures may appear in each partition. In this way, the UE 450, having selected in block 706 a preference for one of the Rel-99 PRACH message, the 10 ms TTI, or the 2 ms TTI, may select from among the corresponding signatures for a PRACH preamble transmission.

One possible variation on the example illustrated in FIG. 9 might be to partition the signature space between a first set of signatures for legacy UEs to utilize, and a second set of signatures for UEs configured according to the present disclosure. In this way, the second set of signatures may be further partitioned into groups of one or more signatures, each group corresponding to one of the Rel-99 PRACH message, the 2 ms TTI on the E-DCH, or the 10 ms TTI on the E-DCH.

In the example illustrated in FIG. 10, the PRACH preamble scrambling codes are partitioned into three partitions, each partition corresponding to one of the Rel-99 PRACH message, the 10 ms TTI, or the 2 ms TTI. Here, each partition includes one scrambling code; however, in various examples according to aspects of the present disclosure, any suitable number of scrambling codes may appear in each partition. In this way, the UE 450, having selected in block 706 a preference for one of the Rel-99 PRACH message, the 10 ms TTI, or the 2 ms TTI, may select from among the corresponding scrambling codes for a PRACH preamble transmission.

In the example illustrated in FIG. 11, a combination of the above is utilized. That is, in this example, a first set of PRACH preambles may be utilized as in a conventional system, e.g., to maintain backwards compatibility with legacy UEs. In this way, referring again to FIG. 7, the one or more lists of common E-DCH resources transmitted on the broadcast channel may include a first list for utilization by the legacy UEs, and a second list for utilization by UEs configured in accordance with the present disclosure. Here, the first list can be utilized to map the resources for scrambling codes and signature sequences for utilization by the legacy UEs; and the second list can partition one or both of the scrambling codes and/or signature sequences to indicate a preference for a Rel-99 PRACH, a 10 ms TTI, or a 2 ms TTI. Of course, a UE configured in accordance with aspects of the present disclosure would not necessarily be disallowed from utilizing the first set of PRACH preambles, and that set may be utilized within the scope of the present disclosure for a PRACH preamble transmission.

In the example illustrated in FIG. 12, the PRACH preamble scrambling codes are partitioned into two sets: a first set for backwards compatibility with legacy UEs, and a second set adapted for UEs configured according to aspects of the present disclosure. Here, one example may utilize the first set to configure legacy UEs across the entire cell to utilize 2 ms or 10 ms TTIs for uplink E-DCH transmissions, as in a conventional Enhanced PRACH procedure as described above; and may utilize the second set to configure UEs configured according to aspects of the present disclosure for the other of the 2 ms or 10 ms TTIs. Here, configuration of the first set to request 10 ms TTIs, while configuring the second set to request 2 ms TTIs would be most convenient, so that, as described below, the network may override the UE's request for the 2 ms TTI and instead allocate the 10 ms TTI to that UE.

Of course, the examples illustrated in FIGS. 9-12 are only exemplary in nature, and as those of ordinary skill in the art would recognize, any other suitable partitioning of common E-DCH resources and PRACH resources maybe utilized within the scope of the present disclosure.

Returning to block 708, having selected a particular partition in accordance with the preference for the uplink transmission determined in block 706, the UE may then select a particular combination of scrambling code and/or signature sequence within the selected partition. For example, the particular scrambling code to utilize for the PRACH preamble partition may be randomly selected from among the scrambling codes within the selected partition. Similarly, the particular signature sequence to utilize for the PRACH preamble partition may be randomly selected from among the signature sequences within the selected partition. Having thereby selected a signature sequence and scrambling code, the UE may then transmit an access attempt including a PRACH preamble utilizing the selected scrambling code and signature sequence.

In block 710, the Node B 410 runs a searcher process to search for the access attempt transmitted by the UE 450 in block 708. Here, if the searcher at the Node B 410 is configured to detect the presence of the scrambling code utilized by the UE configured according to the present disclosure in the access attempt transmitted in block 708, then the moment the Node B 410 detects energy on that scrambling code, it would know that the access attempt is originating from a UE configured according to the present disclosure, i.e., with the capability for flexible resource assignment for uplink transmissions in the non-DCH state. In block 712, the Node B 410, either on its own or in coordination with one or more network nodes such as an RNC, determines resources that would be available for use by a UE for an uplink transmission.

Based on the resources determined to be available in block 712, and whether those resources correspond to the resources requested by the UE 450 in block 708, at block 714 the Node B 410 may determine whether or not to honor the UE's indicated preference. That is, in accordance with an aspect of the present disclosure, the Node B 410 may choose to honor the UE's request for resources to transmit on one of the Rel-99 PRACH message, or utilizing the E-DCH resource pool with one of the 2 ms or 10 ms TTI, or the Node B 410 may choose to override the UE's request and assign other resources to the UE. Here, the decision to override the UE's request could arise from Node B processing limitations, from a noise rise, from rise over thermal (RoT) considerations, or for any other suitable reason.

Whether the Node B 410 chooses to honor or override the UE's request, in accordance with a further aspect of the present disclosure, at block 716 the Node B 410 may transmit a response to the access attempt on a response channel, e.g., the acquisition indicator channel (AICH). Here an information element such as an acquisition indicator (AI) and/or an extended acquisition indicator (E-AI) on the AICH may be utilized to indicate the resource assignment to the UE 450, i.e., indicating whether the Node B 410 honored or overrode the UE's request. That is, the AI and/or E-AI may be utilized to signal to the UE 450 whether to transmit uplink data on the Rel-99 PRACH message, or to transmit the uplink data utilizing the E-DCH with either the 2 ms or the 10 ms TTI.

At block 718, the UE 450 may monitor the AICH, with an aim to receive the transmission from the Node B 410. That is, in accordance with a conventional, legacy random access procedure, a legacy UE typically only monitors the AICH looking for an AI corresponding to the requested resource. In this way, the legacy UE can determine that the message is (likely) for that UE, and accordingly utilize that resource. However, in an aspect of the present disclosure, the message transmitted to the UE 450 on the AICH might not designate the same resource that the UE 450 requested, since the network may wish to override the UE's preference and assign other resources to the UE 450. Thus, in an aspect of the present disclosure, the UE 450 may monitor a larger portion of the AICH than the legacy UE, potentially monitoring all AICH transmissions in the cell. That is, the UE 450 may monitor the AI and/or the E-AI on the AICH in response to the PRACH preamble transmission, and in accordance with a characteristic of the AI and/or E-AI received on the AICH, the UE 450 may receive either the requested resource or a different resource if its preference was overridden. In one example, the UE 450 may receive the AI and/or the E-AI on a particular signature, either corresponding to the signature that indicates that the UE 450 was allocated the resource it indicated a preference for in block 708, or corresponding to a different signature that indicates that the UE 450 was allocated a different resource, i.e., that the preference indicated by the UE 450 was overridden. In another example, the UE 450 may detect an AI and/or an E-AI bit (or bits) adapted to signal a resource index and, in the case that the resource is an E-DCH resource, a second AI and/or an E-AI bit (or bits) to signal the TTI value assigned to the UE. In any case, aspects of the present disclosure provide the network with the capability to override the UE's request in terms of TTI selection for a common E-DCH resource, or a Rel-99 PRACH message.

In a further aspect of the present disclosure, one Walsh code utilized on the E-AI may be reserved for UEs configured in accordance with the present disclosure. That is, under current specifications, the E-AI includes a plurality of Walsh codes, and on each code information representing a +1 or an −1 may be sent. Thus, each Walsh code may be utilized to represent two different resource indices. In an aspect of the present disclosure, one of the Walsh codes, e.g., the last Walsh code in the space, may be reserved such that a +1 or −1 transmitted on that code may represent the 2 ms TTI and the 10 ms TTI, respectively (or the 10 ms TTI and the 2 ms TTI, respectively). In this way, it may simplify the task for the UE 450, such that it can look to this particular Walsh code rather than monitoring the entire AICH.

At block 720, the UE 450 may determine what resources were allocated by the Node B 410 in accordance with the AI and/or the E-AI received on the AICH in block 718; and in block 722, the UE 450 may utilize the allocated resources for an uplink data transmission in the non-DCH state, e.g., in Cell_FACH.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, the method comprising:
   selecting a scrambling code adapted to indicate that the user equipment is capable of more than one resource assignment from among a plurality of available resource assignments;
   selecting a preferred resource from at least a first preferred E-DCH resource comprising a 10 ms transmission time interval and a second preferred E-DCH resource comprising a 2 ms transmission time interval, the selecting the preferred resource comprising:
      selecting, as the preferred resource, the first preferred E-DCH resource comprising the 10 ms transmission time interval if a function of an initial uplink transmit power utilized on a random access preamble transmission is greater than a power threshold; and
      selecting, as the preferred resource, the second preferred E-DCH resource comprising the 2 ms transmission time interval if the function of the initial uplink transmit power utilized on the random access preamble transmission is not greater than the power threshold; and
   transmitting data corresponding to an access attempt utilizing the selected scrambling code, wherein the data further indicates the selected preferred resource.

2. The method of claim 1, wherein the transmitting of data corresponding to the access attempt comprises transmitting the data corresponding to the access attempt while in a non-DCH state.

3. The method of claim 2, wherein the non-DCH state is a Cell_FACH state.

4. The method of claim 1, wherein the transmitting of data corresponding to the access attempt further comprises utilizing a selected signature from among a plurality of signature sequences,
   wherein the plurality of signature sequences is partitioned into a plurality of sets of signatures, each of the sets of signatures corresponding to a particular resource preference, such that a selection of the selected signature in a set of the plurality of sets of signatures is based on a preference of the particular resource corresponding to the selected set.

5. The method of claim 1, wherein the preferred resource is selected from among the first preferred E-DCH resource comprising a 10 ms transmission time interval and the second preferred E-DCH resource comprising a 2 ms transmission time interval, and further from among a PRACH message, the method further comprising:
   selecting as the preferred resource the PRACH message if an amount of data in a transmit buffer is less than a data threshold; and
   selecting as the preferred resource the first preferred E-DCH resource comprising a 10 ms transmission time interval or the second preferred E-DCH resource comprising a 2 ms transmission time interval if the amount of data in the transmit buffer is not less than the data threshold.

6. The method of claim 1, further comprising:
   receiving a response to the access attempt, the response configured to grant the preferred resource, to over-ride the indication of the preferred resource and grant a non-preferred resource, or to deny the access attempt.

7. The method of claim 6, wherein the response comprises an enhanced acquisition indicator (E-AI) adapted to indicate an allocated resource corresponding to one of the preferred resource or the non-preferred resource.

8. The method of claim 7, wherein the response further comprises a first E-AI bit adapted to signal a resource index.

9. The method of claim 8, wherein the response further comprises a second E-AI bit adapted to signal a transmission time interval assigned to the user equipment.

10. A user equipment configured for wireless communication, comprising:
    at least one processor;
    a memory operatively coupled to the at least one processor; and
    a transmitter operatively coupled to the at least one processor,
    wherein the at least one processor is configured to:
       select a scrambling code adapted to indicate that the user equipment is capable of more than one resource assignment from among a plurality of available resource assignments; and
       select a preferred resource from at least a first preferred E-DCH resource comprising a 10 ms transmission time interval and a second preferred E-DCH resource comprising a 2 ms transmission time interval, the at least one processor is further configured to:
          select, as the preferred resource, the first preferred E-DCH resource comprising the 10 ms transmission time interval if a function of an initial uplink transmit power utilized on a random access preamble transmission is greater than a power threshold; and
          select, as the preferred resource, the second preferred E-DCH resource comprising the 2 ms transmission time interval if the function of the initial uplink transmit power utilized on the random access preamble transmission is not greater than the power threshold; and
       transmit data corresponding to an access attempt utilizing the selected scrambling code, wherein the data further indicates the selected preferred resource.

11. The user equipment of claim 10, wherein the transmitting of data corresponding to the access attempt comprises transmitting the data corresponding to the access attempt while in a non-DCH state.

12. The user equipment of claim 11, wherein the non-DCH state is a Cell_FACH state.

13. The method of claim 10, wherein the transmitting of data corresponding to the access attempt further comprises utilizing a selected signature from among a plurality of signature sequences,
 wherein the plurality of signature sequences is partitioned into a plurality of sets of signatures, each of the sets of signatures corresponding to a particular resource preference, such that a selection of the selected signature in a set of the plurality of sets of signatures is based on a preference of the particular resource corresponding to the selected set.

14. The user equipment of claim 10, wherein the preferred resource is selected from among the first preferred E-DCH resource comprising a 10 ms transmission time interval and the second preferred E-DCH resource comprising a 2 ms transmission time interval, and further from among a PRACH message,
 wherein the at least one processor is further configured to:
  select as the preferred resource the PRACH message if an amount of data in a transmit buffer is less than a data threshold; and
  select as the preferred resource the first preferred E-DCH resource comprising a 10 ms transmission time interval or the second preferred E-DCH resource comprising a 2 ms transmission time interval if the amount of data in the transmit buffer is not less than the data threshold.

15. The user equipment of claim 10, further comprising a receiver operatively coupled to the at least one processor, wherein the at least one processor is further configured to:
 receive a response to the access attempt, the response configured to grant the preferred resource, to over-ride the indication of the preferred resource and grant a non-preferred resource, or to deny the access attempt.

16. The user equipment of claim 15, wherein the response comprises an enhanced acquisition indicator (E-AI) adapted to indicate an allocated resource corresponding to one of the preferred resource or the non-preferred resource.

17. The user equipment of claim 16, wherein the response further comprises a first E-AI bit adapted to signal a resource index.

18. The user equipment of claim 17, wherein the response further comprises a second E-AI bit adapted to signal a transmission time interval assigned to the user equipment.

19. A user equipment configured for wireless communication, comprising:
 means for selecting a scrambling code adapted to indicate that the user equipment is capable of more than one resource assignment from among a plurality of available resource assignments;
 means for selecting a preferred resource from at least a first preferred E-DCH resource comprising a 10 ms transmission time interval and a second preferred E-DCH resource comprising a 2 ms transmission time interval, the means for selecting the preferred resource comprising:
  means for selecting, as the preferred resource, the first preferred E-DCH resource comprising the 10 ms transmission time interval if a function of an initial uplink transmit power utilized on a random access preamble transmission is greater than a power threshold; and
  means for selecting, as the preferred resource, the second preferred E-DCH resource comprising the 2 ms transmission time interval if the function of the initial uplink transmit power utilized on the random access preamble transmission is not greater than the power threshold; and
 means for transmitting data corresponding to an access attempt utilizing the selected scrambling code, wherein the data further indicates the selected preferred resource.

20. A computer program product operable at a user equipment, comprising:
 a non-transitory computer-readable storage medium comprising:
  instructions for causing a computer to select a scrambling code adapted to indicate that the user equipment is capable of more than one resource assignment from among a plurality of available resource assignments;
  instructions for causing a computer to select a preferred resource from at least a first preferred E-DCH resource comprising a 10 ms transmission time interval and a second preferred E-DCH resource comprising a 2 ms transmission time interval, the instructions for causing a computer to select the preferred resource comprising:
   instructions for causing a computer to select, as the preferred resource, the first preferred E-DCH resource comprising the 10 ms transmission time interval if a function of an initial uplink transmit power utilized on a random access preamble transmission is greater than a power threshold; and
   instructions for causing a computer to select, as the preferred resource, the second preferred E-DCH resource comprising the 2 ms transmission time interval if the function of the initial transmit power utilized on the random access preamble transmission is not greater than the power threshold; and
  instructions for causing a computer to transmit data corresponding to an access attempt utilizing the selected scrambling code, the data configured to indicate the selected preferred resource.

* * * * *